(12) United States Patent
Kalinli-Akbacak et al.

(10) Patent No.: US 10,127,927 B2
(45) Date of Patent: Nov. 13, 2018

(54) EMOTIONAL SPEECH PROCESSING

(71) Applicant: Sone Computer Entertainment Inc., Tokyo (JP)

(72) Inventors: Ozlem Kalinli-Akbacak, Burlingame, CA (US); Ruxin Chen, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 179 days.

(21) Appl. No.: 14/743,673

(22) Filed: Jun. 18, 2015

(65) Prior Publication Data

US 2016/0027452 A1    Jan. 28, 2016

Related U.S. Application Data

(60) Provisional application No. 62/030,013, filed on Jul. 28, 2014.

(51) Int. Cl.
*G10L 25/63* (2013.01)
*G10L 17/26* (2013.01)
(Continued)

(52) U.S. Cl.
CPC .............. *G10L 25/63* (2013.01); *G10L 17/26* (2013.01); *G10L 15/063* (2013.01); *G10L 15/07* (2013.01)

(58) Field of Classification Search
None
See application file for complete search history.

(56) References Cited

U.S. PATENT DOCUMENTS 6,006,186 A    12/1999    Chen et al.
6,173,258 B1    1/2001    Menendez-Pidal et al.
(Continued)

OTHER PUBLICATIONS

Jonghwa Kim and Elisabeth Andre, "Emotion Recognition Based on Physiological Changes in Music Listening", Dec. 2008, IEEE.*
(Continued)

*Primary Examiner* — Lennin RodriguezGonzalez
(74) *Attorney, Agent, or Firm* — JDI Patent; Joshua D. Isenberg; Robert Pulllman

(57) ABSTRACT

A method for emotion or speaking style recognition and/or clustering comprises receiving one or more speech samples, generating a set of training data by extracting one or more acoustic features from every frame of the one or more speech samples, and generating a model from the set of training data, wherein the model identifies emotion or speaking style dependent information in the set of training data. The method may further comprise receiving one or more test speech samples, generating a set of test data by extracting one or more acoustic features from every frame of the one or more test speeches, and transforming the set of test data using the model to better represent emotion/speaking style dependent information, and use the transformed data for clustering and/or classification to discover speech with similar emotion or speaking style. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

29 Claims, 3 Drawing Sheets

(51) Int. Cl.
*G10L 15/06* (2013.01)
*G10L 15/07* (2013.01)

(56) References Cited

U.S. PATENT DOCUMENTS

| | | | |
|---|---|---|---|
| 6,216,103 B1 | 4/2001 | Wu et al. |
| 6,473,735 B1 | 10/2002 | Wu et al. |
| 6,718,302 B1 | 4/2004 | Wu et al. |
| 6,768,979 B1 | 7/2004 | Tanaka et al. |
| 6,778,959 B1 | 8/2004 | Wu et al. |
| 7,778,831 B2 | 8/2010 | Chen |
| 7,921,011 B2 | 4/2011 | Abrego et al. |
| 7,970,613 B2 | 6/2011 | Chen |
| 8,010,358 B2 | 8/2011 | Chen |
| 8,050,922 B2 | 11/2011 | Chen |
| 8,190,433 B2 | 5/2012 | Abrego et al. |
| 8,355,515 B2 | 1/2013 | Mao et al. |
| 8,442,829 B2 | 5/2013 | Chen |
| 8,442,833 B2 | 5/2013 | Chen |
| 8,549,442 B2 | 10/2013 | Marks et al. |
| 8,632,182 B2 | 1/2014 | Chen et al. |
| 8,638,364 B2 | 1/2014 | Chen et al. |
| 8,645,985 B2 | 2/2014 | Deshpande et al. |
| 8,712,773 B2 | 4/2014 | Zheng et al. |
| 8,719,023 B2 | 5/2014 | Menendez-Pidal et al. |
| 8,756,061 B2 | 6/2014 | Kalinli et al. |
| 8,786,698 B2 | 7/2014 | Chen et al. |
| 8,788,256 B2 | 7/2014 | Chen et al. |
| 8,886,526 B2 | 11/2014 | Yoo et al. |
| 9,020,822 B2 | 4/2015 | Kalinli-Akbacak |
| 9,031,293 B2 | 5/2015 | Kalinli-Akbacak |
| 9,092,135 B2 | 7/2015 | Chen |
| 9,099,096 B2 | 8/2015 | Yoo et al. |
| 9,153,235 B2 | 10/2015 | Zhang et al. |
| 2006/0277032 A1 | 12/2006 | Hernandez-Abrego et al. |
| 2007/0061142 A1 | 3/2007 | Hernandez-Abrego et al. |
| 2007/0061413 A1 | 3/2007 | Larsen et al. |
| 2007/0061851 A1 | 3/2007 | Deshpande et al. |
| 2007/0112566 A1 | 5/2007 | Chen |
| 2007/0139443 A1 | 6/2007 | Marks et al. |
| 2007/0198261 A1 | 8/2007 | Chen |
| 2007/0198263 A1 | 8/2007 | Chen |
| 2009/0252344 A1 | 10/2009 | Mao et al. |
| 2010/0121640 A1 | 5/2010 | Zheng et al. |
| 2010/0211376 A1 | 8/2010 | Chen et al. |
| 2010/0211387 A1 | 8/2010 | Chen |
| 2010/0211391 A1 | 8/2010 | Chen |
| 2010/0324898 A1 | 12/2010 | Chen |
| 2011/0191107 A1 | 8/2011 | Abrego et al. |
| 2011/0288869 A1 | 11/2011 | Menendez-Pidal et al. |
| 2012/0075462 A1 | 3/2012 | Chen et al. |
| 2012/0075463 A1 | 3/2012 | Chen et al. |
| 2012/0110447 A1 | 5/2012 | Chen |
| 2012/0253812 A1 | 10/2012 | Kalinli et al. |
| 2012/0259554 A1 | 10/2012 | Chen et al. |
| 2012/0268359 A1 | 10/2012 | Chen et al. |
| 2012/0281181 A1 | 11/2012 | Chen et al. |
| 2012/0295708 A1 | 11/2012 | Hernandez-Abrego et al. |
| 2013/0268272 A1 | 10/2013 | Zhang et al. |
| 2013/0294608 A1 | 11/2013 | Yoo et al. |
| 2013/0294611 A1 | 11/2013 | Yoo et al. |
| 2013/0297296 A1 | 11/2013 | Yoo et al. |
| 2013/0297298 A1 | 11/2013 | Yoo et al. |
| 2014/0059484 A1 | 2/2014 | Marks et al. |
| 2014/0112556 A1 | 4/2014 | Kalinli-Akbacak |
| 2014/0114655 A1 | 4/2014 | Kalinli-Akbacak |
| 2014/0121002 A1 | 5/2014 | Deshpande et al. |
| 2014/0149112 A1 | 5/2014 | Kalinli-Akbacak |
| 2014/0198382 A1 | 7/2014 | Chen et al. |
| 2014/0237277 A1 | 8/2014 | Mallinson et al. |
| 2014/0347272 A1 | 11/2014 | Hernandez-Abrego et al. |
| 2015/0073794 A1 | 3/2015 | Kalinli-Akbacak et al. |
| 2016/0019883 A1* | 1/2016 | Aronowitz ............ G10L 17/04 704/244 |

OTHER PUBLICATIONS

U.S. Appl. No. 62/030,013, to Ozlem Kalinli-Akbacak, filed Jul. 28, 2014.

* cited by examiner

EMOTIONAL SPEECH PROCESSING

CLAIM OF PRIORITY

This application is a nonprovisional of commonly-assigned U.S. Provisional Patent Application No. 62/030,013 filed Jul. 28, 2014, the entire disclosure of which are incorporated herein by reference.

FIELD OF THE DISCLOSURE

This disclosure is related to speech processing and more particularly to emotional speech processing.

BACKGROUND

Emotional speech processing is important for many applications including user interfaces, games, and many more. However, it is very challenging to handle emotional speech. For example, emotional speech characteristics significantly differ from read/conversational speech and hence statistical voice recognition models trained with read speech perform poorly when emotional speech is encountered. Also, emotion recognition is difficult since different speakers have different ways of conveying their emotions and hence classes are ambiguous and hard to separate.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the aspects of the present disclosure described below are set forth without any loss of generality to, and without imposing limitations upon, the claimed invention.

Introduction

Aspects of the present disclosure are directed to a system that normalizes speech representation using Probabilistic Linear Discriminant Analysis (PLDA) so that in PLDA subspace speech features will be more emotion/speaking style dependent and less speaker dependent. In other words, the goal of PLDA is to remove speaker information from speech so that it is more emotion/speaking style dependent. PLDA can be applied over Gaussian Mixture Model (GMM) mean/variance supervectors or it can be directly applied on acoustic features. Early experiments showed that when PLDA is applied, emotional clustering accuracy has significantly been improved. Also, preliminary experiments showed that it may be possible to learn PLDA transformation in a language (i.e. German) and apply it for a different language (i.e. English) for emotion clustering/recognition purpose. Hence, it may also be possible to learn a universal transformation by learning PLDA transformation from emotional speech data collected from multiple languages. The proposed method can be used for clustering of emotional speech, classification of emotional speech, clustering of speaking styles, classification of speaking styles, for emotion-specific acoustic model training for voice recognition using automatically discovered emotion clusters, or for speaking style (fast/slow/normal/singing etc.) specific acoustic model training for voice recognition using automatically created clusters.

The proposed method can be used for clustering of emotional speech, classification of emotional speech, clustering of speaking styles, classification of speaking styles. For example, using automatically discovered emotion clusters, emotion specific acoustic models can be trained for voice recognition. Similarly, using automatically clustered speaking styles (fast/slow/normal/singing etc.); specific acoustic models can be trained for voice recognition, language model parameters (i.e. insertion penalty) can be tuned for specific cluster, etc.

Embodiments

Figure 1:
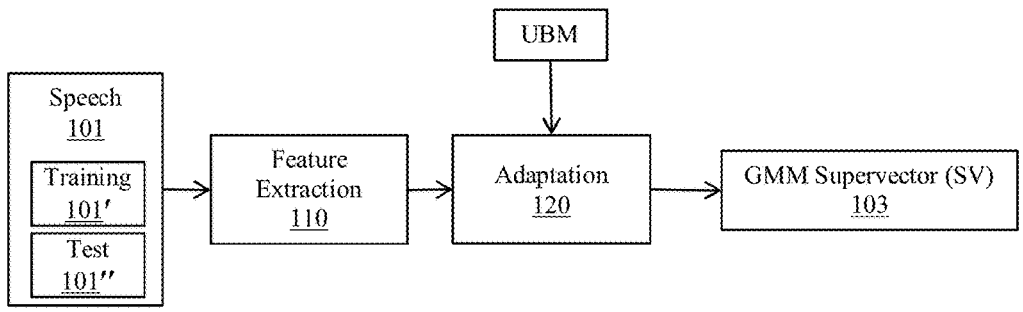
FIG. 1 is a flow diagram illustrating generation of Gaussian Mixture Model (GMM) supervectors that may be used in conjunction with aspects of the present disclosure.

According to aspects of the present disclosure, an emotion clustering method may be based on Probabilistic Linear Discriminant Analysis (PLDA). By way of example, each emotional utterance may be modeled as a Gaussian Mixture Model (GMM) mean supervector. FIG. 1 illustrates an example of generation of GMM supervectors (GMM SVs). Initially, one or more speech signals 101 are received. Each speech signal 101 may be any segment of a person's speech. By way of example and not by way of limitation, the signals 101 may contain a single syllable, word, sentence, or any combination of these. By way of example, and not by way of limitation, the speech signals 101 may be captured with a local microphone or received over a network, recorded, digitalized and/or stored in a computer memory or other non-transitory storage medium. The speech signals 101 may be later used for PLDA model training and/or for clustering of emotions or emotion classification. In some embodiments, the speech signals for PLDA model training (i.e., training data 101') may be different from the speech signals for emotion recognition (i.e., test data 101"). In other words, the training data set 101' is not required to have the same emotions/speaking styles or speakers as the test data set 101".

The one or more speech signals 101 (either training data 101' or test data 101") are passed through a processing stage 110 that operates to extract acoustic features from every frame of each utterance 101. Features such as, Mel-frequency cepstral coefficients (MFCCs), Mel-filterbank features, and the like, are commonly used low-level spectral features for emotion recognition. By way of example, and not by way of limitation, 39-dimensional MFCCs (13 coefficients including energy, deltas and double deltas) can be used. After feature extraction, the features extracted from each utterance are sent to the processing stage 120 of model adaptation. The extracted features can be modeled as a Gaussian Mixture Model (GMM), and represented by the mean and/or variance supervector. For example, a previously trained Universal Background Model (UBM) can be adapted to the feature vectors extracted from each utterance. For UBM training, for example neutral speech from many speakers can be used. Adaptation techniques such as Maximum A Posteriori (MAP), Maximum Likelihood Linear Regression (MLLR), Constrained Maximum Likelihood Linear Regression (C-MLLR) etc. can be used for adaptation. Mean and/or variance vectors for the obtained GMMs are stacked to build a supervector 103 per each utterance. With this processing, all the utterances, either the training data 101' or test data 101", may be modeled as GMM supervectors. In addition, other features such as speaking rate, syllable rate, pitch features, energy features, duration features, and the like can be extracted and appended to the GMM SV.

Figure 2:
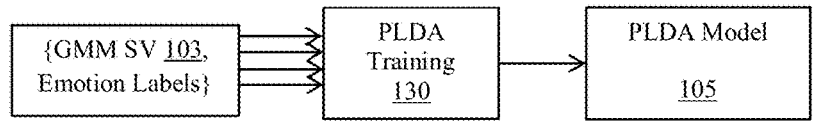
FIG. 2 is a flow diagram illustrating training of Probabilistic Linear Discriminant Analysis (PLDA) model that may be used in conjunction with aspects of the present disclosure.

Next, GMM supervectors 103 collected from training data 101' can be used to train a PLDA model 105 as depicted in FIG. 2. The PLDA training data should just include a number of different emotions with a variety of samples for each emotion. At the training processing stage 130, input to the PLDA training would be a stack of GMM supervectors 103 from training utterances together with their emotion labels, and the output would be PLDA model parameters 105. The PLDA model parameters may be stored, transmitted, or used to apply PLDA model 105 to test data 101".

Figure 3:
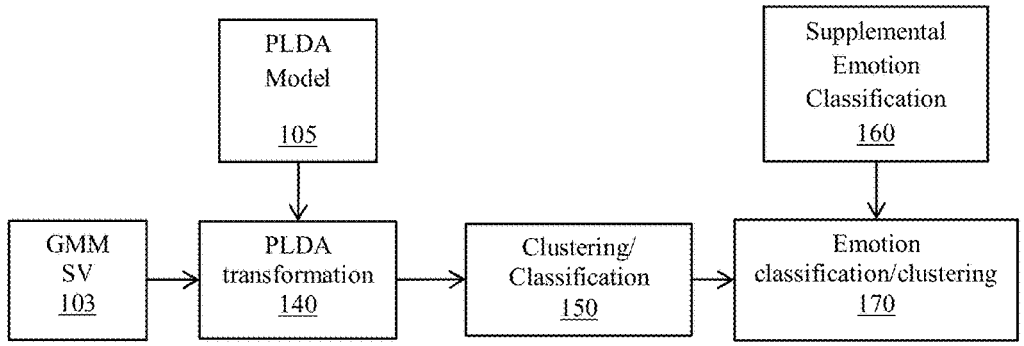
FIG. 3 is a flow diagram illustrating clustering of emotions or emotion classification of spoken words that may be used in conjunction with aspects of the present disclosure.

As shown in FIG. 3, GMM SVs 103 collected from the test data 101" are transformed at a transformation stage 140 to dimension reduced GMM supervectors. Next, a clustering method at stage 150 such as k-means, hierarchical clustering, and the like can be applied to cluster the dimension reduced GMM supervectors thereby producing a final emotion classification/clustering 170. The PLDA model can be trained with a different emotional database from the test data, with different emotion categories, speakers, or even languages. The advantage of using a PLDA model is that it identifies emotion dependent subspaces of the GMM mean supervector space.

The proposed emotion clustering method is semi-supervised. For clustering (at stage 150), the method does not train emotion models. Instead, a PLDA model 105 is trained using a separate emotional data set. The training data 101' for the PLDA model is not required to have the same emotions, speakers, language, etc. as the test data 101". Linear discriminant classifiers can be used for emotion recognition. Compared to Linear Discriminant Analysis (LDA), which is commonly applied to maximize the between-class data separation while minimizing the within-class scatter, PLDA is a generative model that can be used for recognition on previously unseen classes; e.g., emotions.

In accordance with certain aspects of the present disclosure, the clustering at 150 may optionally be augmented by combining the speech emotion/classification 150 with supplemental emotion classification 160 using emotion recognition done in parallel by one or more other methods to produce the final emotion classification 170. By way of example, and not by way of limitation, in applications where both audio and video images of the user are captured, the supplemental emotion classification may use facial emotion recognition of one or more frames of video images of a person speaking that are concurrent with captured speech signals 101 from that person. For example, many digital cameras that include a smile detection feature based on facial image analysis. The supplemental emotion classification 160 may involve detection of a speaker's smile in a video image as a feature to recognize happiness in the speaker.

Other techniques for supplemental emotion recognition include, but are not limited to, video analysis of body language, either from video analysis or in conjunction with biometric sensors, such as Electroencephalography (EEG) or skin conductivity sensors. All PLDA methods described herein can be used for emotion classification of facial image data and other forms of supplemental emotion recognition.

PLDA for Clustering of Emotions or Emotion Classification

The proposed emotion clustering method is identifying emotion related subspaces in the speech data among all the other subspaces that represent variations such as speaker, language, etc. This is done based on Probabilistic Linear Discriminant Analysis (PLDA). Linear Discriminant Analysis (LDA) is a common method in pattern recognition using a linear combination of the features to separate two or more classes based on maximizing the between-class data separation while minimizing the within-class scatter. Probabilistic LDA (PLDA) is a generative model which is more suitable for recognition tasks on previously unseen classes. Therefore, PLDA model can be trained on any available emotional database, and applied to cluster emotional speech for emotions, speakers, or languages that were not present for training. It is noted that the PLDA model previously applied for face recognition applications when the lighting or pose of the probe and gallery images were different, and for speaker clustering. Aspects for the present disclosure propose a method using PLDA for emotion clustering an emotional speech processing.

Assuming the training data 101' consists of J utterances for each I emotions, where it assumed that the emotions are known for each utterance in the training data, the data generation can be modeled as $$x_{ij} = \mu + Fh_i + Gw_{ij} + \varepsilon_{ij} \quad (1)$$

where $x_{ij}$ represents the $j^{th}$ utterance of the $i^{th}$ emotion, with i=1 . . . I and j=1 . . . J. The model has two components: 1) the signal component $\mu+Fh_i$ that depends only on the emotion but not particular utterance; hence describes the between-emotion variation, and 2) the noise component $Gw_{ij}+\varepsilon_{ij}$ that is different for every utterance of the emotion and denotes the within-emotional noise. The term $\mu$ is the overall mean of the training data, and F and G are matrices which contain bases for between-emotion and within-emotion subspaces, respectively. $h_i$ and $w_{ij}$ are latent variables and finally $\varepsilon_{ij}$ is the remaining unexplained variation called residual noise term which is defined to be Gaussian with a diagonal covariance matrix $\Sigma$. The output of PLDA training is the model $\Theta=\{\mu, F, G, \Sigma\}$, which can be trained using Expectation Maximization (EM) algorithm.

The term $h_i$ is important since this represents the emotion identity i. For example, in emotion recognition/clustering, the likelihood that two utterances were generated from the same underlying $h_i$ can be considered; i.e., if two utterances have the same emotion they must have the same variable $h_i$, otherwise they will have different $h_i$. The model in Eq (1) can be formalized in terms of conditional probabilities:

$$Pr(x_{ij}|h_i,w_{ij},\Theta) = N_x(\mu+Fh_i+Gw_{ij},\Sigma) \quad (2)$$

$$Pr(h_i) = Nh(0,I) \quad (3)$$

$$Pr(w_{ij}) = Nw(0,I) \quad (4)$$

where $N_a(\mu, \Sigma)$ represents a Gaussian with mean $\mu$ and covariance $\Sigma$. Basically, in training phase (as shown in FIG. 2), it is aimed to learn model parameters $\Theta = \{\mu, F, G, \Sigma\}$, in the recognition and clustering phase (as shown in FIG. 3), it is to make inference about whether emotions match or belong to the same cluster.

In the recognition/clustering phase, the likelihood that N supervectors $x_{1,2}, \ldots, x_N$ belong to the same emotion is the likelihood that these supervectors share the same emotion variable h regardless of noise variables $w_1, w_2, \ldots, w_N$. These N generative models can be combined.

$$\begin{bmatrix} x_1 \\ x_2 \\ \vdots \\ x_N \end{bmatrix} = \begin{bmatrix} \mu \\ \mu \\ \vdots \\ \mu \end{bmatrix} + \begin{bmatrix} F & G & 0 & \ldots & 0 \\ F & 0 & G & \ldots & 0 \\ \vdots & \vdots & \vdots & \ddots & \vdots \\ F & 0 & 0 & \ldots & G \end{bmatrix} \begin{bmatrix} h \\ w_1 \\ w_2 \\ \vdots \\ w_N \end{bmatrix} + \begin{bmatrix} \varepsilon_1 \\ \varepsilon_2 \\ \vdots \\ \varepsilon_N \end{bmatrix} \quad (5)$$

which can be re-written as $$x' = \mu' + Ay + \varepsilon' \quad (6)$$

Then, the likelihood of N supervectors being from the same emotion can be determined as $$Pr(x') = N(x'|\mu', AA^T + \Sigma') \quad (7)$$

where $$\Sigma' = \begin{bmatrix} \Sigma & 0 & \ldots & 0 \\ 0 & \Sigma & \ldots & 0 \\ \vdots & \vdots & \ddots & \vdots \\ 0 & 0 & \ldots & \Sigma \end{bmatrix} \quad (8)$$

In clustering, initial emotion clusters can be obtained by baseline clustering using full dimensional supervectors. Then, refined clusters can be obtained using PLDA dimensionality reduced space. After the initial clustering, each supervector can be compared to other supervectors in the same cluster and other clusters based on likelihood ratio: e.g., compare x and y utterances belonging to the same emotion cluster (hypothesis H1) vs belonging to different emotion clusters (hypothesis H2). Then, create clusters by moving samples to the corrected clusters based on likelihood ratio. Details of likelihood ratio calculation based on PLDA are discussed in S. Ioffe, "Probabilistic linear discriminant analysis," Computer Vision—ECCV, pp. 531-542, 2006, the entire disclosures of which are incorporated herein by reference. Clustering methods such as k-means, hierarchical agglomerative clustering, etc. can be used for emotion clustering using PLDA likelihood ratio as distance measure.

In recognition/classification, one can compare the likelihood of the data under R different models and if two or more utterances share the same emotion, then they must have the same emotion identity variable h; otherwise they will have different emotion identity variables. Again PLDA likelihood ratio can be used for emotion recognition/classification purpose.

Also, when there is no sufficient labeled data available, emotion clusters can be automatically created using PLDA subspace to have labels. Then, these clusters can be used for training emotion models, which can be used for emotion recognition/classification purpose.

It is noted that while PLDA is applied on GMM mean supervector in preceding discussion, PLDA can also be applied over features directly. By way of example, and not by way of limitation, frame level features or features stacked over a window duration can be used directly by replacing GMM supervectors for PLDA model training.

Figure 4:
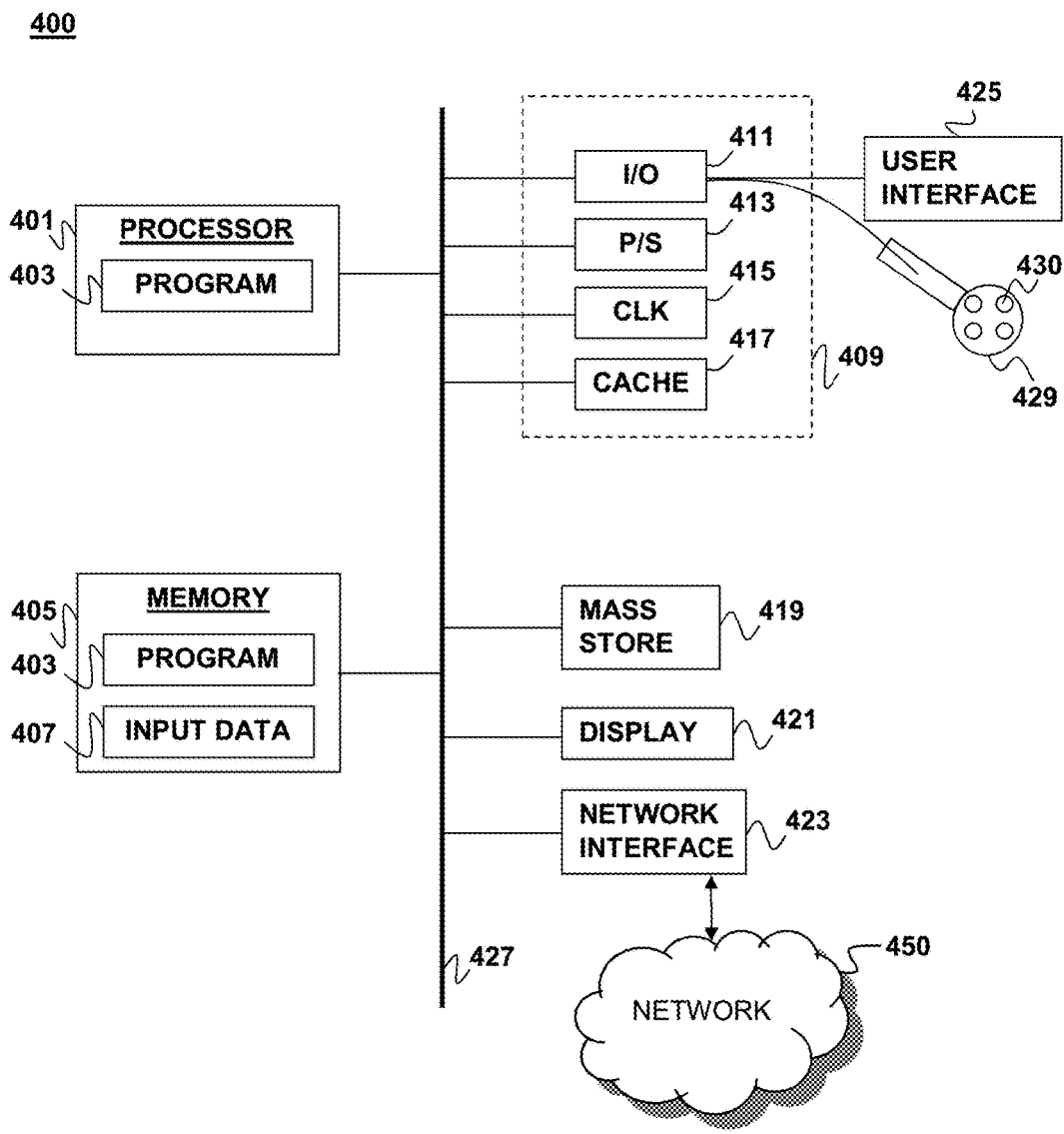
FIG. 4 is a block diagram illustrating an apparatus for emotional speech processing according to an aspect of the present disclosure.

Aspects for the present disclosure may be implemented on a suitably configured computer apparatus. FIG. 4 illustrates a block diagram of an apparatus 400 that may be used to implement a method of emotional speech processing according to one aspect of the present disclosure. The apparatus 400 generally may include a processor module 401 and a memory 405.

The processor module 401 may include one or more processor cores. The processor module 401 may include multiple processor cores, e.g., if parallel processing is to be implemented. Examples of suitable multi-core processors, include, but are not limited to dual-core processors, quad-core processors, processor architectures having a main processor and one or more co-processors, cell processor architectures, and the like. The ability to process data in parallel saves valuable processing time, leading to a more efficient and streamlined system for emotion recognition.

The memory 405 may be in the form of an integrated circuit, e.g., RAM, DRAM, ROM, and the like. The memory 405 may also be a main memory that is accessible by all of the processor modules. In some embodiments, the processor module 401 may have local memories associated with each core. A program 403 may be stored in the main memory 305 in the form of processor readable instructions that can be executed on the processor modules. The program 403 may be configured to perform generation of GMM supervectors, training of a PLDA model and clustering of emotions or emotion classification of spoken words as described above with respect to FIGS. 1, 2 and 3. The program 403 may be written in any suitable processor readable language, e.g., C, C++, JAVA, Assembly, MATLAB, FORTRAN, and a number of other languages. Input data 407 may also be stored in the memory. Such input data 407 may include input speech signal (e.g., a single syllable, word sentence or any combination of these), GMM supervectors, or PLDA models. During execution of the program 403, portions of program code and/or data may be loaded into the memory or the local stores of processor cores for parallel processing by multiple processor cores.

The apparatus 400 may also include well-known support functions 409, such as input/output (I/O) elements 411, power supplies (P/S) 413, a clock (CLK) 415, and a cache 417. The apparatus 400 may optionally include a mass storage device 419 such as a disk drive, CD-ROM drive, tape drive, or the like to store programs and/or data. The apparatus 400 may optionally include a display unit 421 and user interface unit 425 to facilitate interaction between the apparatus and a user. The display unit 421 may be in the form of a cathode ray tube (CRT) or flat panel screen that displays text, numerals, graphical symbols or images.

The user interface 425 may include a keyboard, mouse, joystick, touch screen, touch pad, or other device that may be used in conjunction with a graphical user interface (GUI). The apparatus 400 may also include a network interface 423 to enable the device to communicate with other devices over a network 450, such as the internet. By way of example and not by way of limitation, a speech signal may be received over the network 450 and recorded and/or stored in the mass storage device 419.

In some embodiments, the apparatus 400 may include a local microphone 429, which may be a single microphone or a microphone array. The microphone 429 can be coupled to the processor 401 via the I/O elements 411. By way of example, and not by way of limitation, different input speech signals may be captured and recorded using the microphone 429. In some implementations, the microphone 429 may be a single microphone or a microphone array having two or more spaced-apart microphones. Each microphone may include an acoustic transducer 430 that converts acoustic signals into electrical signals. The I/O elements 411 may be configured to convert analog electrical signals from the microphones into the digital signal data 407.

By way of example, and not by way of limitation, digital pictures may be generated with a digital camera, e.g., a video or still camera, which may be part of the user interface 425 or which may be a separate peripheral coupled to the apparatus 400, e.g., via the I/O elements 411. According to some aspects, the digital pictures may be analyzed by a software application executed by the processor 401. Such software may be a routine or other sub-component of the program 403 or may be part of a separate program.

The components of the apparatus 400, including the processor 401, memory 405, support functions 409, mass storage device 419, user interface 425, network interface 423, and display 421 may be operably connected to each other via one or more data buses 427. These components may be implemented in hardware, software or firmware or some combination of two or more of these.

Experimental Results

Early experiments have shown that when PLDA is applied, emotional clustering accuracy has significantly been improved. For example, an emotional Chinese database achieved 45.4% improvement on 5-emotion clustering (neutral, angry, anxious, happy, sad) with the proposed PLDA clustering compared to the baseline where full size supervectors are used without PLDA.

Preliminary experiments have also shown that it may be possible to learn a PLDA transformation in one language (e.g., German) and apply it for a different language (e.g., English) for emotion clustering/recognition purposes. In one experiment, a PLDA model was trained from German emotional data with three emotional categories of neutral, angry, and sad, then applied to English emotional speech. For example, 21.4% improvement is achieved compared to baseline for binary clustering of neutral and angry on the English emotional speech, even if a PLDA model trained from German emotional speech is used. Thus, it may also be possible to learn a universal transformation by learning PLDA model from emotional speech data collected from multiple languages.

Although much of the foregoing discussion addresses emotion clustering/classification, the same approach can also be used for speaking style clustering/classification. For example, varying speaking styles such as normal, fast, slow, singing, and the like, can be learned in an un-supervised manner as following the process listed above; i.e., instead of emotion classes, speaking style classes would be learned.

Application to Speech Recognition

Figure 5:
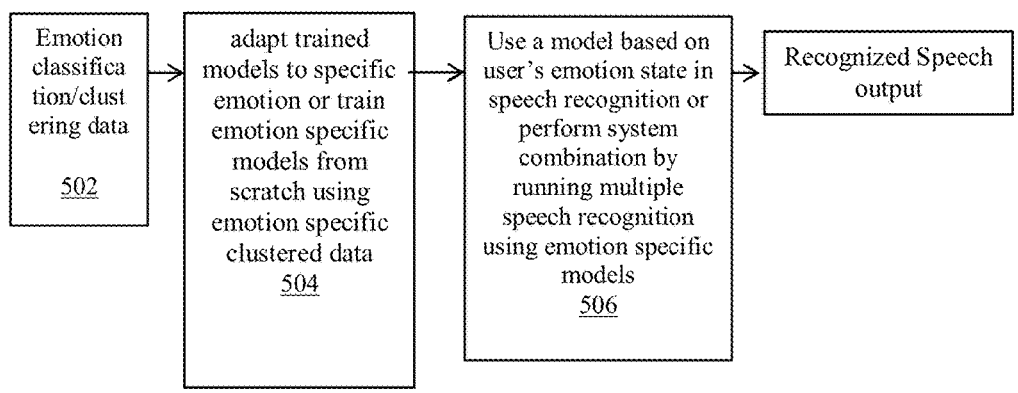
FIG. 5 is a flow diagram illustrating use of clustering of emotions or emotion classification in speech recognition according to aspects of the present disclosure.

The flow diagram in FIG. 5 illustrates an example of a speech recognition method that uses emotional clustering or classification of speech of the type described, e.g. in FIG. 3. The method of FIG. 5 may be implemented by the system 400, e.g., as part of the program 403 shown in FIG. 4. One of the difficulties of emotional speech is that it is hard to find available training data for acoustic modeling training. By using the aforementioned semi-supervised emotional speech clustering, a collected database can be grouped into uniform clusters based on emotions such as neutral, happy, sad, angry, and the like, as indicated at 502. Then, as indicated at 504, these clustered data can be used to either adapt neutral/read speech trained models to the specific emotion or if the data is large enough models can be trained from scratch using these emotion specific clustered data.

Similarly, different speaking styles (fast/slow/normal/singing etc.) also present challenges for speech recognition. Data collected from varying speaking styles can be clustered using the aforementioned method with PLDA and then these data in the clusters can be used to tune speech recognition models and parameters to specific speaking styles.

Then, at runtime, based on user's estimated emotion state, the matching acoustic model can be used to improve speech recognition performance on test data, as indicated at 506. Alternatively, multiple speech recognitions can be run using multiple emotionally/speaking style tuned acoustic models, and their outputs can be combined to achieve the highest accuracy as indicated at 506. Similarly, the language model and dictionary can be adapted based on the emotion/speaking style at 504 and can be used in speech recognition at 506. For example, when people are bored they tend to speak slower whereas excited people tend to speak faster, which eventually changes word pronunciations. The dictionary, which consists of the pronunciation of words as a sequence of phonemes, can also be dynamically adapted based on the user's emotion to better match the user's speech characteristic due to his/her emotion. Again, multiple dictionaries tuned to certain emotion classes can be created offline, and then used based on the estimated user emotion to improve speech recognition performance. Similarly, in singing, there may be sections where speech is slow (e.g., prolonged sounds) and there may be sections where speech is fast (e.g., rap singing). Once the style is detected, speech recognition models and parameters can be tuned to maximize the accuracy.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
   receiving one or more speech samples, wherein the one or more speech samples are characterized by one or more emotions or speaking styles from one or more speakers;
   generating a set of training data by extracting one or more acoustic features from every frame of the one or more sample speeches; and
   generating a model from the set of training data, wherein the model identifies emotion or speaking style dependent information in the set of training data, wherein the model includes the application of a Probabilistic Linear Discriminant Analysis (PLDA) to identify an emotion related subspace.

2. The method of claim 1, wherein generating a model includes generating a PLDA model represented by PLDA parameters.

3. The method of claim 2, further comprising:
receiving one or more test speech samples;
generating a set of test data by extracting one or more acoustic features from every frame of the one or more test speech samples; and
transforming the set of test data into transformed data using the PLDA model to capture emotion and/or speaking style in the transformed data; and
using the transformed data for clustering and/or classification to discover speech with emotion or speaking styles similar to that captured in the transformed data.

4. The method of claim 3, wherein the one or more test speeches includes one or more speakers and one or more emotions or speaking styles different from the one or more sample speeches.

5. The method of claim 3, wherein transforming the set of test data includes transforming the set of test data into dimension reduced GMM supervectors using PLDA.

6. The method of claim 3, wherein using the transformed data for clustering and/or classification to discover speech with similar emotion or speaking styles that captured in the transformed data includes:
adapting one or more neutral/read speech trained models to a specific emotion/emotions using the transformed data; and
performing speech recognition using the one or more adapted models.

7. The method of claim 3, wherein using the transformed data for clustering and/or classification to discover speech with similar emotion or speaking styles to that captured in the transformed data includes:
training one or more emotional speech models from scratch using the transformed data; and
performing speech recognition using the one or more trained emotional models.

8. The method of claim 3, wherein generating a set of test data includes model adaptation for modelling the extracted acoustic features as a Gaussian Mixture Model (GMM) and representing the set of test data with GMM mean supervectors.

9. The method of claim 3, further comprising augmenting the classification and/or clustering with supplemental emotion classification using emotion recognition done in parallel by one or more methods other than analysis of speech samples.

10. The method of claim 1, wherein generating a set of training data includes model adaptation for modelling the extracted acoustic features as a Gaussian Mixture Model (GMM) and representing the set of training data with GMM mean supervectors.

11. The method of claim 1, wherein the one or more sample speeches are captured by a local microphone.

12. The method of claim 1, wherein the one or more speeches are received over a network or from a local storage device.

13. The method of claim 1, further comprising saving or transmitting the model, or applying the model to test data to characterize a speaking style or emotion in the test data.

14. A system, comprising:
a processor module;
a memory coupled to the processor, wherein the memory contains executable instructions configured to implement a method, the method comprising:
receiving one or more speech samples;
generating a set of training data by extracting one or more acoustic features from every frame of the one or more speech samples; and
generating a model from the set of training data, wherein the model identifies emotion or speaking style dependent information in the set of training data, wherein the model includes the application of a Probabilistic Linear Discriminant Analysis (PLDA) to identify an emotion related subspace.

15. The system of claim 14, wherein generating a model includes generating a PLDA model represented by PLDA parameters.

16. The system of claim 14, generating a set of training data includes model adaptation for modelling the extracted acoustic features as a Gaussian Mixture Model (GMM) and representing the set of training data with GMM mean supervectors.

17. The system of claim 14, the one or more sample speeches include a plurality of emotions or speaking styles with the one or more sample speeches from one or more persons for each emotion or speaking style.

18. The system of claim 14, wherein the one or more speech samples are captured by a microphone.

19. The system of claim 14, further comprising the microphone.

20. The system of claim 14, wherein the one or more speech samples are received over a network or received from a local storage device.

21. The system of claim 14, further comprising a network interface or the local storage device.

22. The system of claim 14, wherein the method further comprises:
receiving one or more test speech samples;
generating a set of test data by extracting one or more acoustic features from every frame of the one or more test speech samples;
transforming the set of test data into transformed data using the PLDA model to capture emotion and/or speaking style in the transformed data; and
using the transformed data for clustering and/or classification to discover speech with emotion or speaking styles similar to that captured in the transformed data.

23. The system of claim 22, wherein the one or more test speech samples includes one or more speakers and one or more emotions or speaking styles different from one or more speech samples in the training data.

24. The system of claim 22, wherein transforming the set of test data includes transforming the set of test data into dimension reduced GMM supervectors using Probabilistic Linear Discriminant Analysis (PLDA).

25. The system of claim 22, wherein using the transformed data for clustering and/or classification to discover speech with similar emotion or speaking styles that captured in the transformed data includes:
adapting one or more neutral/read speech trained models to a specific emotion/emotions using the transformed data; and
performing speech recognition using the one or more adapted models.

26. The system of claim 22, wherein using the transformed data for clustering and/or classification to discover speech with similar emotion or speaking styles that captured in the transformed data includes:
training one or more emotional speech models from scratch using the transformed data; and
performing speech recognition using the one or more trained emotional models.

27. The system of claim 22, wherein the method further comprises augmenting the classification and/or clustering with supplemental emotion classification using emotion recognition done in parallel by one or more methods other than analysis of speech samples.

28. A non-transitory computer readable medium having embodied therein computer readable instructions configured, to implement a method, the method comprising:
   receiving one or more speech samples, wherein the one or more speech samples are characterized by one or more emotions or speaking styles from one or more speakers;
   generating a set of training data by extracting one or more acoustic features from every frame of the one or more sample speeches; and
   generating a model from the set of training data, wherein the model identifies emotion or speaking style dependent information in the set of training data, wherein the model includes the application of a Probabilistic Linear Discriminant Analysis (PLDA) to identify an emotion related subspace.

29. The non-transitory computer readable medium of claim 28, wherein the method further comprises:
   receiving one or more test speech samples;
   generating a set of test data by extracting one or more acoustic features from every frame of the one or more test speech samples;
   transforming the set of test data into transformed data using a Probabilistic Linear Discriminant Analysis (PLDA) model to capture emotion and/or speaking style in the transformed data; and
   using the transformed data for clustering and/or classification to discover speech with emotion or speaking styles similar to that captured in the transformed data.

\* \* \* \* \*